(12) United States Patent
Bursell

(10) Patent No.: US 11,848,924 B2
(45) Date of Patent: Dec. 19, 2023

(54) MULTI-FACTOR SYSTEM-TO-SYSTEM AUTHENTICATION USING SECURE EXECUTION ENVIRONMENTS

(71) Applicant: Red Hat, Inc., Raleigh, NC (US)

(72) Inventor: Michael Hingston McLaughlin Bursell, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/068,471

(22) Filed: Oct. 12, 2020

(65) Prior Publication Data

US 2022/0116375 A1    Apr. 14, 2022

(51) Int. Cl.
*H04L 9/40* (2022.01)

(52) U.S. Cl.
CPC ................... *H04L 63/08* (2013.01)

(58) Field of Classification Search
CPC ............ H04L 63/08; H04L 2463/082
See application file for complete search history.

(56) References Cited

U.S. PATENT DOCUMENTS

| | | | | |
|---|---|---|---|---|
| 6,161,185 A * | 12/2000 | Guthrie | ............... | H04L 63/0846 709/229 |
| 6,377,691 B1 * | 4/2002 | Swift | .................. | H04L 63/0869 380/277 |
| 7,024,695 B1 * | 4/2006 | Kumar | .................. | G06F 21/305 726/26 |
| 8,443,187 B1 * | 5/2013 | Orr | ......................... | H04L 63/08 726/5 |

(Continued)

FOREIGN PATENT DOCUMENTS

| | | |
|---|---|---|
| CN | 109218260 A | 1/2019 |
| CN | 110851231 A | 2/2020 |

(Continued)

OTHER PUBLICATIONS

Radboud University Nijmegen, The Netherlands; SURFnet bv, Utrecht, The Netherlands, van Rijswijk-DU, Roland and Poll, Erik, "Using Trusted Execution Environments in Two-factor Authentication: Comparing Approaches", https://dl.gi.de/bilstream/handle/20.500.12116/17195/20.pdf?sequence=1, 12 pages.

(Continued)

*Primary Examiner* — Aravind K Moorthy
(74) *Attorney, Agent, or Firm* — Lowenstein Sandler LLP

(57) ABSTRACT

Systems and methods for implementing multi-factor system-to-system authentication using secure execution environments. An example method comprises: determining, by a first computing system, using a secure execution environment, a measure of one or more computing processes running on the first computing system; presenting, to a second computing system, a first authentication factor derived from the measure; computing, using the secure execution environment, a second authentication factor derived from at least one of: one or more first data items received from the second computing system, one or more confidential second data items received from one or more third computing systems, or one or more public data items received from one or more fourth computing systems; and presenting the second authentication factor to the second computing system.

20 Claims, 8 Drawing Sheets

(56) References Cited

U.S. PATENT DOCUMENTS

| | | | |
|---|---|---|---|
| 8,966,021 B1* | 2/2015 | Allen | G06F 9/45533 |
| | | | 717/109 |
| 9,032,414 B1* | 5/2015 | Dalal | G06F 11/1469 |
| | | | 718/104 |
| 9,106,645 B1* | 8/2015 | Vadlamani | G06F 1/14 |
| 9,219,611 B1* | 12/2015 | Naik | G06F 21/64 |
| 9,225,735 B1* | 12/2015 | Banerjee | G06F 21/554 |
| 9,544,287 B1* | 1/2017 | Sokolov | H04L 63/0884 |
| 9,609,000 B2 | 3/2017 | Karame et al. | |
| 9,692,599 B1* | 6/2017 | Krahn | H04L 9/3247 |
| 9,813,402 B1* | 11/2017 | Chen | H04L 63/08 |
| 9,876,823 B2 | 1/2018 | Smith et al. | |
| 9,948,681 B1* | 4/2018 | Kruse | H04L 63/20 |
| 9,992,018 B1* | 6/2018 | Tjew | H04L 9/3271 |
| 10,044,695 B1* | 8/2018 | Cahill | H04L 63/08 |
| 10,055,561 B2* | 8/2018 | Moore | G06F 21/316 |
| 10,390,222 B2* | 8/2019 | Khosravi | H04W 12/068 |
| 10,447,663 B2 | 10/2019 | Sun et al. | |
| 10,454,975 B1* | 10/2019 | Sharifi Mehr | H04L 63/20 |
| 10,558,812 B2 | 2/2020 | Thom et al. | |
| 10,650,003 B1* | 5/2020 | Rubin | G06F 16/24573 |
| 10,666,643 B2* | 5/2020 | Mathew | H04L 63/0869 |
| 10,740,466 B1 | 8/2020 | BShara | |
| 10,880,283 B1* | 12/2020 | Roth | G06F 21/604 |
| 10,979,430 B1* | 4/2021 | Hitchcock | H04L 63/102 |
| 11,051,163 B1* | 6/2021 | Smith | H04L 63/0876 |
| 11,055,273 B1* | 7/2021 | Meduri | G06F 16/2358 |
| 11,115,423 B2* | 9/2021 | DiAcetis | H04W 12/06 |
| 11,190,517 B2* | 11/2021 | Drake, II | H04L 63/20 |
| 11,509,658 B1* | 11/2022 | Kulkarni | H04W 12/60 |
| 2002/0034302 A1 | 3/2002 | Moriai et al. | |
| 2003/0191943 A1* | 10/2003 | Poisner | G06F 21/57 |
| | | | 713/181 |
| 2005/0086419 A1 | 4/2005 | Neble et al. | |
| 2007/0294376 A1* | 12/2007 | Ayachitula | G06F 8/61 |
| | | | 709/220 |
| 2008/0098464 A1* | 4/2008 | Mizrah | G06F 21/36 |
| | | | 726/5 |
| 2008/0229103 A1* | 9/2008 | Mutka | H04L 63/0876 |
| | | | 713/168 |
| 2008/0256598 A1* | 10/2008 | Diab | H04L 63/08 |
| | | | 726/2 |
| 2008/0298588 A1* | 12/2008 | Shakkarwar | H04L 9/0816 |
| | | | 380/255 |
| 2010/0268747 A1* | 10/2010 | Kern | H04L 67/1095 |
| | | | 707/E17.032 |
| 2011/0035577 A1 | 2/2011 | Lin et al. | |
| 2011/0213985 A1* | 9/2011 | Miller | G06F 21/35 |
| | | | 713/185 |
| 2011/0302415 A1 | 12/2011 | Ahmad et al. | |
| 2012/0084835 A1* | 4/2012 | Thomas | G06F 21/128 |
| | | | 726/3 |
| 2012/0131653 A1* | 5/2012 | Pasquero | H04L 63/0492 |
| | | | 726/6 |
| 2012/0159591 A1* | 6/2012 | Payne | G06F 21/35 |
| | | | 726/7 |
| 2012/0166141 A1* | 6/2012 | Watkins | G01R 35/00 |
| | | | 702/183 |
| 2013/0018941 A1* | 1/2013 | Olaru | G09B 5/00 |
| | | | 709/203 |
| 2013/0036462 A1* | 2/2013 | Krishnamurthi | G06F 21/31 |
| | | | 726/19 |
| 2013/0152183 A1* | 6/2013 | Plewnia | H04L 9/3213 |
| | | | 726/7 |
| 2014/0019577 A1* | 1/2014 | Lobo | H04L 67/2842 |
| | | | 709/213 |
| 2014/0109190 A1* | 4/2014 | Cam-Winget | G06F 21/30 |
| | | | 726/4 |
| 2014/0205099 A1* | 7/2014 | Christodorescu | H04L 9/321 |
| | | | 380/278 |
| 2014/0245396 A1* | 8/2014 | Oberheide | G06F 21/40 |
| | | | 726/4 |
| 2014/0282964 A1* | 9/2014 | Stubblefield | H04L 63/20 |
| | | | 726/7 |
| 2014/0359290 A1* | 12/2014 | McCusker | H04L 9/006 |
| | | | 713/168 |
| 2015/0113618 A1* | 4/2015 | Sinha | G06F 21/44 |
| | | | 726/6 |
| 2015/0227744 A1* | 8/2015 | Horovitz | G06F 21/57 |
| | | | 726/22 |
| 2015/0318998 A1* | 11/2015 | Erlikhman | H04L 9/0863 |
| | | | 713/171 |
| 2015/0326398 A1* | 11/2015 | Modarresi | G06F 21/44 |
| | | | 713/168 |
| 2016/0065376 A1 | 3/2016 | Smith et al. | |
| 2016/0087792 A1 | 3/2016 | Smith et al. | |
| 2016/0088021 A1* | 3/2016 | Jayanti Venkata | H04W 4/50 |
| | | | 726/1 |
| 2016/0180068 A1* | 6/2016 | Das | H04L 63/0861 |
| | | | 726/7 |
| 2016/0180078 A1* | 6/2016 | Chhabra | G06F 21/57 |
| | | | 726/19 |
| 2016/0248752 A1* | 8/2016 | Blinn | H04L 63/083 |
| 2016/0294562 A1* | 10/2016 | Oberheide | H04L 9/0863 |
| 2016/0316364 A1* | 10/2016 | Blanco | H04W 12/041 |
| 2016/0342774 A1 | 11/2016 | Henkel-Wallace et al. | |
| 2016/0371475 A1* | 12/2016 | Zhao | H04L 63/08 |
| 2017/0012959 A1* | 1/2017 | Sierra | H04L 63/104 |
| 2017/0032111 A1* | 2/2017 | Johansson | G06F 21/44 |
| 2017/0126661 A1* | 5/2017 | Brannon | H04L 63/0815 |
| 2017/0195457 A1* | 7/2017 | Smith, II | H04L 63/10 |
| 2017/0244709 A1* | 8/2017 | Jhingran | H04L 63/08 |
| 2017/0257363 A1* | 9/2017 | Franke | H04W 12/069 |
| 2017/0279795 A1* | 9/2017 | Redberg | H04L 63/0861 |
| 2017/0289118 A1* | 10/2017 | Khosravi | H04W 4/80 |
| 2017/0300683 A1* | 10/2017 | Movsisyan | G06F 21/33 |
| 2017/0302445 A1 | 10/2017 | Kobayashi et al. | |
| 2017/0329966 A1 | 11/2017 | Koganti | |
| 2017/0351536 A1* | 12/2017 | Kamalakantha | G06F 9/45558 |
| 2017/0366532 A1* | 12/2017 | Garfinkle | H04L 63/08 |
| 2017/0374014 A1* | 12/2017 | Sastri | H04L 67/10 |
| 2017/0374049 A1 | 12/2017 | Ateniese et al. | |
| 2018/0004930 A1 | 1/2018 | Csinger et al. | |
| 2018/0007060 A1* | 1/2018 | Leblang | H04L 63/0861 |
| 2018/0026940 A1* | 1/2018 | Sastri | H04L 63/08 |
| | | | 711/202 |
| 2018/0083932 A1* | 3/2018 | Adams | H04L 63/08 |
| 2018/0097787 A1* | 4/2018 | Murthy | H04L 63/08 |
| 2018/0097789 A1* | 4/2018 | Murthy | H04L 63/0227 |
| 2018/0101847 A1* | 4/2018 | Pisut, IV | G06Q 20/40145 |
| 2018/0109504 A1* | 4/2018 | Poffenbarger | H04L 9/3234 |
| 2018/0114000 A1 | 4/2018 | Taylor | |
| 2018/0136943 A1* | 5/2018 | Chew | G06F 9/445 |
| 2018/0150331 A1* | 5/2018 | Chen | G06F 9/5077 |
| 2018/0176212 A1* | 6/2018 | Nair | H04L 63/0838 |
| 2018/0183586 A1* | 6/2018 | Bhargav-Spantzel | |
| | | | G06F 21/32 |
| 2018/0212769 A1 | 7/2018 | Novak | |
| 2018/0254898 A1 | 9/2018 | Sprague et al. | |
| 2018/0270068 A1 | 9/2018 | Innis et al. | |
| 2018/0288060 A1* | 10/2018 | Jackson | H04L 63/107 |
| 2018/0309567 A1 | 10/2018 | Wooden | |
| 2018/0351944 A1* | 12/2018 | Cho | H04L 9/3271 |
| 2018/0367542 A1* | 12/2018 | Wolf | H04L 63/102 |
| 2018/0375659 A1* | 12/2018 | Kozma | H04L 63/083 |
| 2018/0375852 A1 | 12/2018 | Thom et al. | |
| 2019/0007384 A1* | 1/2019 | Maaroufi | G06F 21/31 |
| 2019/0028456 A1* | 1/2019 | Kurian | H04L 63/10 |
| 2019/0036957 A1 | 1/2019 | Smith et al. | |
| 2019/0050557 A1* | 2/2019 | Martin | H04L 63/08 |
| 2019/0065731 A1* | 2/2019 | Brocious | H04L 9/0838 |
| 2019/0068633 A1* | 2/2019 | Tsirkin | H04L 63/1441 |
| 2019/0097790 A1 | 3/2019 | Li | |
| 2019/0097987 A1* | 3/2019 | Talur | H04L 63/08 |
| 2019/0109839 A1* | 4/2019 | Reston | H04L 63/083 |
| 2019/0139148 A1* | 5/2019 | Piel | G06Q 20/40 |
| 2019/0156301 A1 | 5/2019 | Bentov et al. | |
| 2019/0176753 A1 | 6/2019 | Suzuki et al. | |
| 2019/0188368 A1* | 6/2019 | Hastings | H04L 63/0492 |
| 2019/0190903 A1* | 6/2019 | Chen | H04L 9/3271 |

(56) References Cited

U.S. PATENT DOCUMENTS

| | | | |
|---|---|---|---|
| 2019/0199725 A1* | 6/2019 | Pularikkal | H04W 12/08 |
| 2019/0208009 A1* | 7/2019 | Prabhakaran | H04L 67/51 |
| 2019/0222575 A1 | 7/2019 | Oberhauser | |
| 2019/0243963 A1 | 8/2019 | Soriente et al. | |
| 2019/0280863 A1* | 9/2019 | Meyer | G06F 7/08 |
| 2019/0289017 A1* | 9/2019 | Agarwal | H04L 9/12 |
| 2019/0334921 A1* | 10/2019 | Pattar | H04L 9/3271 |
| 2019/0342080 A1 | 11/2019 | Vakili | |
| 2019/0364034 A1* | 11/2019 | Alexander | H04L 63/12 |
| 2019/0392305 A1 | 12/2019 | Gu et al. | |
| 2020/0007531 A1* | 1/2020 | Koottayi | H04L 67/146 |
| 2020/0007536 A1* | 1/2020 | Piel | H04L 63/102 |
| 2020/0007576 A1* | 1/2020 | Buhacoff | H04L 9/3247 |
| 2020/0027022 A1 | 1/2020 | Jha et al. | |
| 2020/0028693 A1 | 1/2020 | Wu et al. | |
| 2020/0057664 A1 | 2/2020 | Durham et al. | |
| 2020/0067716 A1* | 2/2020 | Camenisch | H04L 9/14 |
| 2020/0076829 A1 | 3/2020 | Wentz | |
| 2020/0092284 A1* | 3/2020 | Zhu | H04L 9/3234 |
| 2020/0125717 A1 | 4/2020 | Wang | |
| 2020/0125772 A1 | 4/2020 | Volos | |
| 2020/0137031 A1 | 4/2020 | Pappachan et al. | |
| 2020/0162454 A1* | 5/2020 | Jain | H04L 63/0853 |
| 2020/0175208 A1* | 6/2020 | Yu | G06F 21/74 |
| 2020/0184467 A1 | 6/2020 | Segaran | |
| 2020/0195639 A1* | 6/2020 | Chien | H04L 63/0876 |
| 2020/0244636 A1* | 7/2020 | Varanasi | H04L 63/08 |
| 2020/0259799 A1 | 8/2020 | Li et al. | |
| 2020/0304488 A1* | 9/2020 | Mimis | H04L 63/083 |
| 2020/0304543 A1* | 9/2020 | Hamlin | H04L 63/108 |
| 2020/0382323 A1* | 12/2020 | Keselman | H04L 9/30 |
| 2020/0403994 A1* | 12/2020 | Bitterfeld | H04L 67/025 |
| 2020/0404003 A1* | 12/2020 | Alameh | H04L 63/0853 |
| 2021/0004454 A1* | 1/2021 | Chester | H04L 63/0807 |
| 2021/0004469 A1 | 1/2021 | Chisnall | |
| 2021/0150044 A1* | 5/2021 | Christofferson et al. | |
| 2021/0152371 A1 | 5/2021 | Fletcher et al. | |
| 2021/0218734 A1* | 7/2021 | Kapinos | H04L 9/3228 |
| 2021/0243180 A1* | 8/2021 | Beale | H04L 47/82 |
| 2021/0243206 A1* | 8/2021 | Shivanna | H04L 41/0631 |
| 2021/0281577 A1 | 9/2021 | Sasaki | |
| 2021/0297412 A1* | 9/2021 | Thayyilsubramanian | G06Q 20/4014 |
| 2021/0312047 A1* | 10/2021 | Chen | G06N 7/08 |
| 2021/0314149 A1* | 10/2021 | Yee | H04L 9/0825 |
| 2021/0314298 A1* | 10/2021 | Chen | G06N 20/00 |
| 2021/0374232 A1 | 12/2021 | Bursell | |
| 2021/0374233 A1 | 12/2021 | Bursell | |
| 2021/0374234 A1 | 12/2021 | Bursell | |
| 2021/0385183 A1* | 12/2021 | Henao Mota | H04L 63/0838 |
| 2022/0012725 A1 | 1/2022 | Rutter | |
| 2022/0050896 A1* | 2/2022 | Ahmed | H04L 63/101 |
| 2022/0109663 A1* | 4/2022 | Swain | H04L 63/08 |
| 2022/0116375 A1* | 4/2022 | Bursell | H04L 63/08 |
| 2022/0206764 A1 | 6/2022 | Scarlata | |

FOREIGN PATENT DOCUMENTS

| | | |
|---|---|---|
| WO | 2019075234 A1 | 4/2019 |
| WO | 2019179543 A2 | 9/2019 |
| WO | 2020104032 A1 | 5/2020 |
| WO | 2020125942 A1 | 6/2020 |

OTHER PUBLICATIONS

Arfaoui et al. "Practical and Privacy-Preserving TEE Migration", 9th Workshop on Information Security Theory and Practice (WISTP), Aug. 2015, Heraklion, Greece. pp. 153-168, 17 pages.

Xiao, et al., "Enforcing Private Data Usage Control with Blockchain and Attested Off-Chain Contract Execution", Virginia Polytechnic Institute and State University, Apr. 15, 2019, 16 pages.

* cited by examiner

MULTI-FACTOR SYSTEM-TO-SYSTEM AUTHENTICATION USING SECURE EXECUTION ENVIRONMENTS

TECHNICAL FIELD

The present disclosure is generally related to cloud computing, and is more specifically related to implementing multi-factor system-to-system authentication using secure execution environments.

BACKGROUND

Multi-factor authentication is an authentication method that requires the person seeking to be the authenticated (e.g., a computer system user) to present two or more of several categories of authentication factors, e.g., the knowledge factor ("something only the user knows"), the possession factor ("something only the user has"), and the inherence factor ("something only the user is"). The more factors are employed by the authentication process, the higher is the probability that the person indeed possesses the asserted identity.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
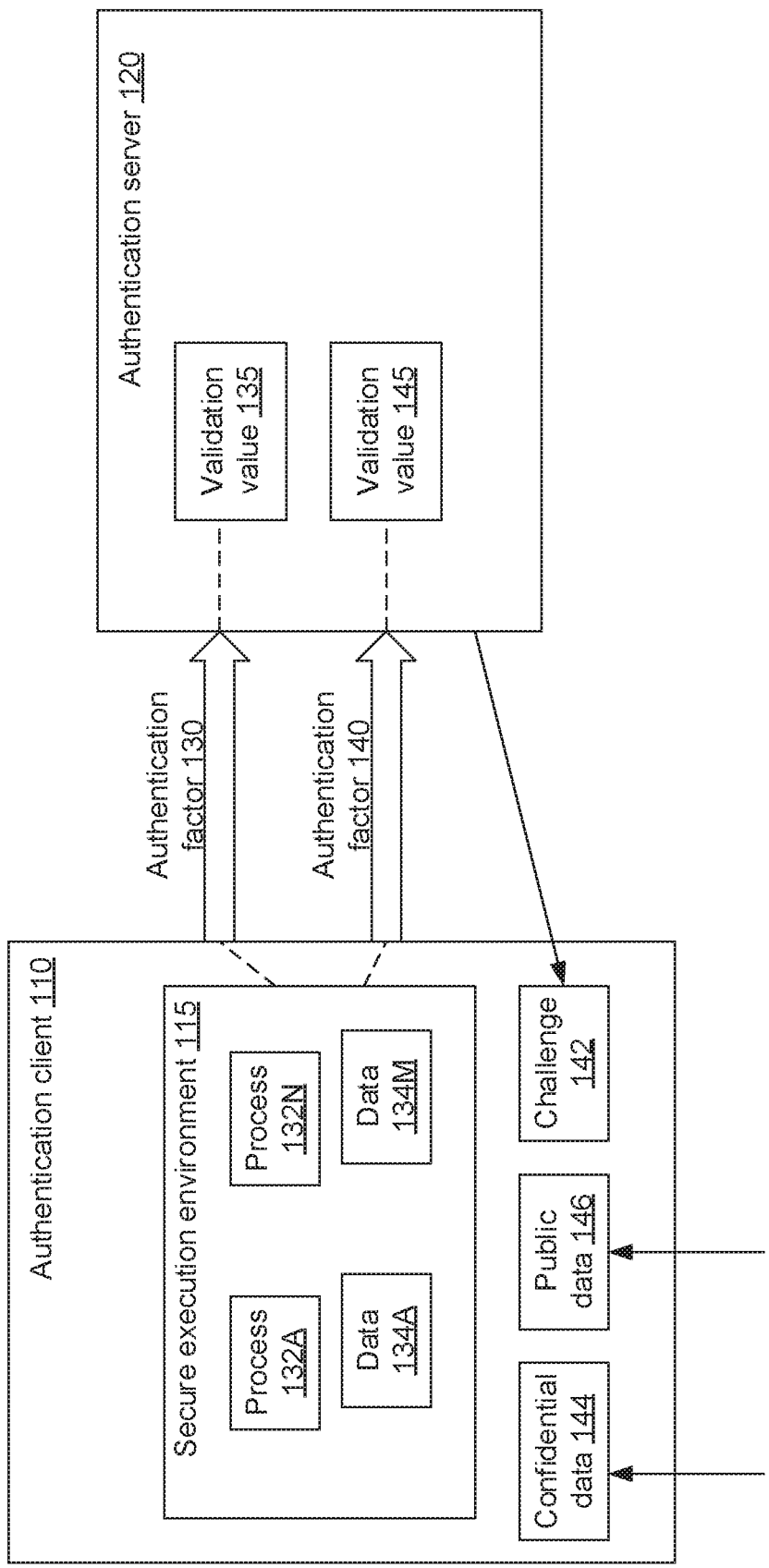
FIG. 1 depicts an example high-level data flow diagram illustrating multi-factor system-to-system authentication implemented in accordance with aspects of the present disclosure.

Described herein are methods and systems for implementing multi-factor system-to-system authentication using secure execution environments.

Multi-factor authentication may be employed for human person authentication, where the human user may be required to supply a set of credentials covering, e.g., the knowledge factor (such as a password), the possession factor (such as a one-time code generated by a portable token-generating device), and/or the inherence factor (such as a biometric input). However, utilizing those factors for system-to-system authentication may present certain challenges, since the difference between the knowledge and possession factors is blurred for systems, while the inherence factor may be difficult to prove due to the lack of reliable "biometric" factors that may be applied to systems.

The present disclosure alleviates these and other deficiencies of various common implementations by providing methods and systems for performing multi-factor system-to-system authentication using secure execution environments. "Secure execution environment" herein refers to a hardware platform architecture or implementation that is capable of implementing an isolated execution environment providing integrity of the applications executing therein and confidentiality of their data. Examples of secure execution environments that may be employed for implementing the systems and methods described herein include Trusted Execution Environments (TEEs), hardware security modules (HSMs), and field-programmable gate arrays (FPGAs), however, other secure execution environments may be suitable for implementing the systems and methods of the present disclosure.

In accordance with aspects of the present disclosure, a computing system to be authenticated ("the authentication client") may employ one or more processes running on a secure execution environment to establish two or more authentication factors to be supplied to another computing system ("the authentication server") which requires the authentication client to be authenticated. The term "authentication client" and "authentication server" designations are purely functional designations utilized in this disclosure to designate the relative roles of the two systems in the authentication process, and may not reflect other aspects of interactions of the two systems between each other and/or with other systems.

In some implementations, the first authentication factor may be represented by the inherence factor, which may reflect a measurement of one or more secure execution environment-resident processes and/or their respective data before the execution. The measurement may be performed by computing a cryptographic hash of the executable images of one or more secure execution environment-resident processes and their respective data sets and/or by cryptographically signing the executable images and data sets. The authentication server may validate the first authentication factor presented by the authentication client by comparing the first authentication factor to a stored measurement value.

The second authentication factor, which may be considered as a possession factor, a knowledge factor, or their combination, may be represented by an outcome of executing a secure execution environment-resident process that processes a combination of authentication server-supplied data, public data, and/or confidential (i.e., non-public) data provided by the authentication server and/or by third parties over a period of time preceding the time of presenting the authentication factor. In some implementations, the second authentication factor may be represented by an outcome of executing a secure execution environment-resident process that generates a response to the challenge data presented by the authentication server, such that the valid response may only be generated based on confidential data that has been supplied to the authentication client by the authentication server and/or third parties over a period of time before presenting the challenge or based on a combination of confidential and public data.

The authentication server may validate the second authentication factor presented by the authentication client by either comparing it to a known response value or by performing computations that are similar to the computations that have been performed by the authentication client in order to compute the second authentication factor, as described in more detail herein below.

While examples of the present disclosure are concerned with one system being authenticated by another system, the authentication methods described herein may be applied to two or more peer systems authenticating each other based on two or more authentication factors presented by each peer system. In some implementations, the authentication process may be symmetric, i.e., system A presents its authentication factors to system B, while system B presents its authentication factors to system A, thus allowing the two systems to mutually authenticate each other. This approach may be further extended to three or more systems, each of which may present its authentication factors to one or more peer systems.

The multi-factor authentication methods described herein may be employed in a wide variety of scenarios, e.g., for secure content distribution or software provisioning. In an illustrative example, the multi-factor authentication methods described herein may be employed for secure distribution of protected content by a content distribution system to one or more content consuming devices via an optional proxy device, such that the content consuming devices may be authenticated by the content distribution system and/or by the content distribution proxy. In another illustrative example, the multi-factor authentication methods described herein may be employed for performing software provisioning in cloud computing environments by authenticating the target hosts (on which the software is being installed) to the software provisioning controller (which manages the software provisioning activities in the cloud) and/or by authenticating the software provisioning controller to the target hosts.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 depicts an example high-level data flow diagram illustrating multi-factor system-to-system authentication implemented in accordance with aspects of the present disclosure. As schematically illustrated by FIG. 1, the authentication client 110 may be authenticated by the authentication server 120 responsive to the authentication client 110 transmitting to the authentication server 120 one or more authentication messages representing at least two authentication factors. The authentication client 110 may employ one or more processes running on a secure execution environment 115 to compute the authentication factors to be supplied to the authentication server 120.

In some implementations, the secure execution environment 115 may be represented by a TEE implemented by a processor of the authentication client 110 or by a processor of a computing device that is reachable by the authentication client 110 over a secure communication channel (e.g., encrypted communication channel). In an illustrative example, the TEE may be implemented by Intel® Software Guard Extensions (SGX) secure enclave, which is a private region of encrypted memory, the contents of which would only be decrypted for access by the process running within the enclave. In another illustrative example, the TEE may be implemented by a virtual machine running in the Intel® Trust Domain Extension (TDX) environment. In another illustrative example, the TEE may be implemented by the AMD® Secure Encrypted Virtualization (SEV), which encrypts the memory state of each virtual machine using a respective encryption key inaccessible by other virtual machines. Various other TEE implementations for the above-referenced and/or other processor architectures may be compatible with the systems and methods of the present disclosure.

Alternatively, the secure execution environment 115 may be represented by a hardware security module (HSM). The HSM may be a plug-in card attached to an internal interface of the authentication client 110 or a peripheral device attached to an external interface of the authentication client 110. The HSM may include one or more general purpose or specialized microprocessors, which may be utilized to compute the requisite authentication factors to be presented by the authentication client 110 to the authentication server 120 or to compute intermediate values from which the authentication factors may be derived by the authentication client 110.

Alternatively, the secure execution environment 115 may be represented by a field-programmable gate array (FPGA) attached to an internal or external interface of the authentication client 110. In various other implementations, other secure execution environments may be suitable for implementing the systems and methods of the present disclosure.

In some implementations, the first authentication factor 130 may be represented by the inherence factor, which may reflect a pre-execution measurement of one or more computing processes 132A-132N residing in the secure execution environment 115 and/or a measurement of one or more data items 134A-134M to be utilized by the computing processes 132A-132N. The measurement may be performed by computing a cryptographic hash of the executable images of the computing processes 132A-132N and data items 134A-134M and/or by cryptographically signing the executable images and data items.

The authentication server 120 may validate the first authentication factor 130 presented by the authentication client 120 by comparing the first authentication factor 130 to a stored validation value 135. In particular, the authentication server 120 may determine that the first authentication factor being is valid responsive to determining that the first authentication factor presented by the authentication client 110 matches a corresponding validation value 135 stored in persistent or non-persistent memory 150 of the authentication server 120. Conversely, responsive to determining that the first authentication factor presented by the authentication client 110 does not matches the stored validation value 135, the authentication server 120 may return an authentication error to the authentication client 110.

The second authentication factor 140 may be considered as a possession factor, a knowledge factor, or their combination. Computing the second authentication factor 140 require knowledge of confidential data that has been supplied to the authentication client 110 by the authentication server 120 and/or third parties (possibly, over a relatively long period of time). In some implementations, computing the second authentication factor may further require knowledge of non-confidential data received from various sources.

In order to determine the second authentication factor 140, the authentication client 110 may run, in the secure execution environment 115, one or more computing processes 132A-132N that receive a combination of challenge data 142 provided by the authentication server 120, confidential data 144 provided by the authentication server 120 and/or third party systems (not shown in FIG. 1), and/or public data 146 provided by third party systems. In order to prevent "man-in-the middle" attacks, the confidential data 144 to be utilized by the authentication client 110 for computing the second authentication factor 140 may be provided by the authentication server 120 using a communication channel that is different from the communication channel that is used for presenting the challenge data 142. Furthermore, at least part of the confidential data 144 may be provided to the authentication client 110 by third party systems (not shown in FIG. 1) over a period of time preceding the moment of presenting the challenge data 142.

In an illustrative example, the challenge data 142 may specify an argument of a mathematical function (e.g., a cryptographic hash function) of two or more arguments, while the remaining arguments may be derived from the confidential data 144 or from a combination of the confidential data 144 and the public data 146.

In another illustrative example, the challenge data 142 may specify a category of objects of a chosen type. For example, the challenge data 142 may specify a category of graphic images (e.g., images depicting a specified thing, place, natural phenomenon, animal, etc.). Alternatively, the challenge data 142 may specify a category of audio streams (e.g., audio streams containing sounds of a specified natural phenomenon or voice of a specified person). Alternatively, the challenge data 142 may specify a custom-defined category of arbitrary numerical data. Accordingly, the expected valid response to the challenge data 142 would be an object of the specified category, such that the object is selected from a set of objects derived from the confidential data 144 or from a combination of the confidential data 144 and the public data 146.

In yet another illustrative example, the challenge data 142 may a category of objects of a chosen type (e.g., a category of graphic images, a category audio streams, or a custom-defined category of arbitrary numerical data) selected from a set of categories derived from a combination of the confidential data 144 and public data 146. In this scenario, the expected valid response to the challenge data 142 would be an object of the specified category, such that the object has been generated by the authentication client 110 or selected from a set of objects derived from the confidential data 144, the public data 146, or their combination.

In yet another illustrative example, the challenge data 142 may represent one or more objects (e.g., graphic images, audio streams, or arbitrary numerical data), and the expected valid response would be their respective categories selected from a list of categories derived from the confidential data 144 or from a combination of the confidential data 144 and the public data 146.

In various implementations, the authentication client 120 may utilize various computation technologies for computing the second authentication factor 140, e.g., utilize trainable classifiers for determining a category of a given object or selecting an object of a specified category from a set of objects. The classifiers may be trained using the confidential data 144, the public data 146, or their combination, which may be received from the authentication server 120 and/or third party systems over a period of time.

The authentication server 120 may validates the second authentication factor 140 presented by the authentication client 110 by either comparing it to a known or computed validation value 145 stored in persistent or non-persistent memory 150 or by performing computations that are same or similar to the computations that have been performed by the authentication client 120 in order to compute the second authentication factor 140.

In some implementations, the authentication client 110 may request the attestation of the secure execution environment and utilize the obtained attestation data to derive the first and/or the second authentication factors. "Attestation" herein refers to a platform-specific mechanism of proving the identity of a computing process running within a secure execution environment, as well as proving that the computing process has not been tampered with and is running on a secure hardware platform.

It should be noted that The "first" and "second" qualifiers of the authentication factors are only utilized in this disclosure to distinguish between the factors, and should not be interpreted as bearing any further semantic meaning, e.g., indicating the order of the factors being computed, their respective priorities, etc.

While the illustrative example of FIG. 1 shows the authentication client 110 authenticated by the authentication server 120, the authentication methods described herein may be applied to two or more peer systems authenticating each other based on two or more authentication factors presented by each peer system. In some implementations, the authentication process may be symmetric, i.e., the system 110 presents its authentication factors to the system 120, while the system 120 presents its authentication factors to the system 110, thus allowing the two systems to mutually authenticate each other. This approach may be further extended to three or more systems, each of which may present its authentication factors to one or more peer systems.

Responsive to completing the authentication procedure described with references to FIG. 1, the authentication client 110 and the authentication server 120 may engage in further interactions in order to perform their respective intended functionalities. The multi-factor authentication methods described herein may be employed in a wide variety of scenarios, e.g., for secure content distribution or software provisioning.

Figure 2:
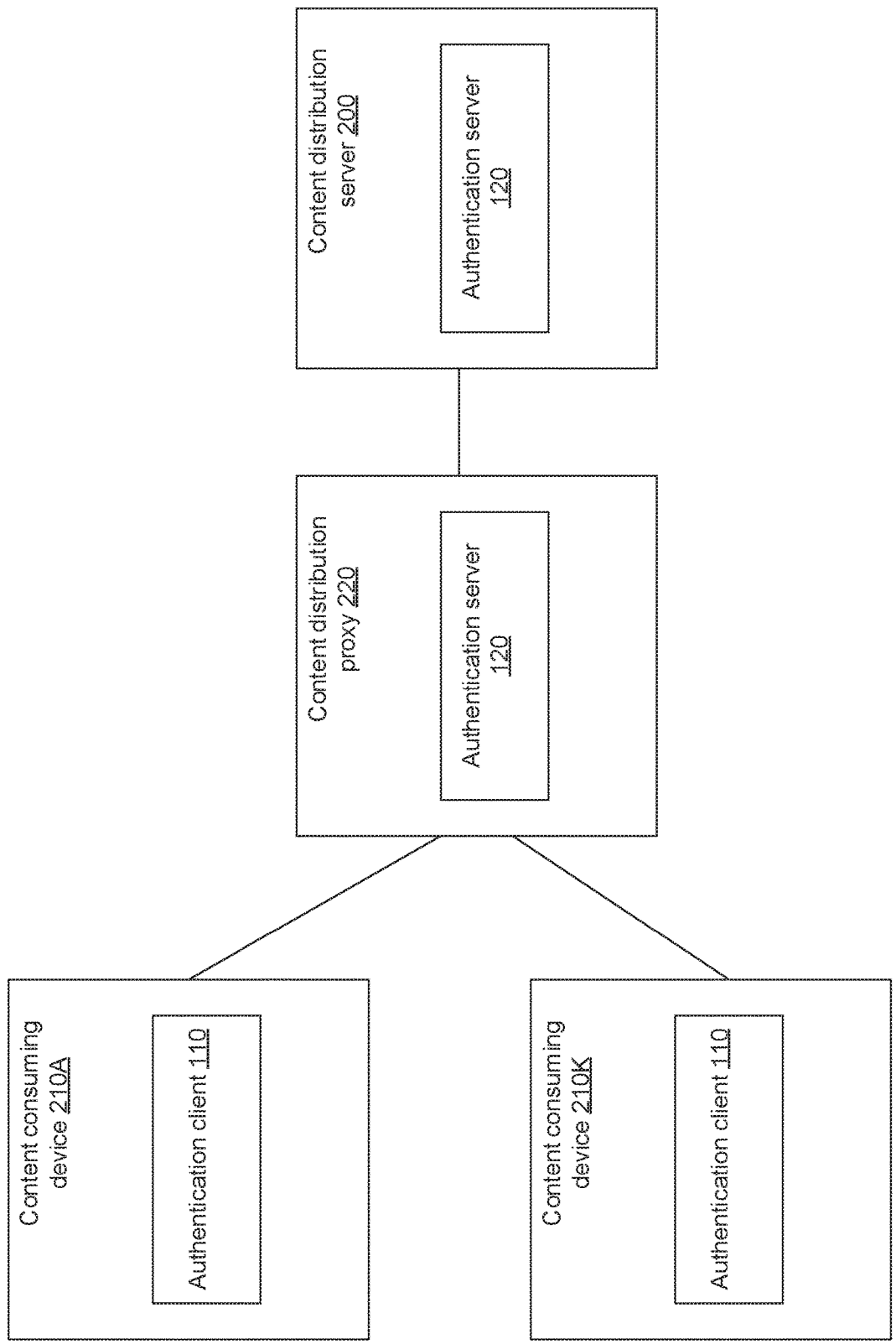
FIG. 2 depicts an example high-level data flow diagram illustrating multi-factor system-to-system authentication in a content distribution system, in accordance with aspects of the present disclosure.

In the illustrative example of FIG. 2, the multi-factor authentication methods described herein may be employed for secure distribution of protected content by a content distribution server 200 to one or more content consuming devices 210A-210K via an optional proxy device 220. Accordingly, each of the content consuming devices 210A-210K may perform the functionality of the authentication client 110 of FIG. 1 in order to be authenticated by the content distribution server 200 and/or by the content distribution proxy 220 performing the functionality of the authentication server 120 of FIG. 1.

Figure 3:
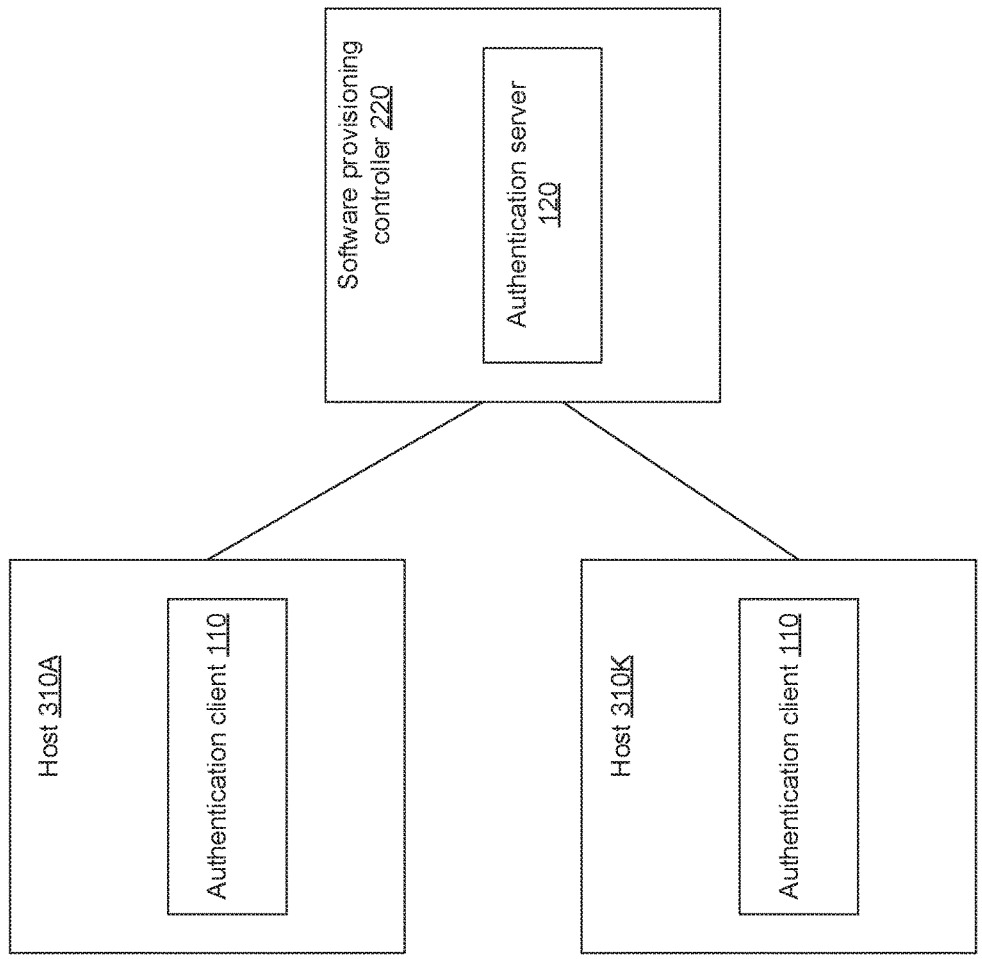
FIG. 3 depicts an example high-level data flow diagram illustrating multi-factor system-to-system authentication in a cloud computing system, in accordance with aspects of the present disclosure.

In the illustrative example of FIG. 3, the multi-factor authentication methods described herein may be employed for performing software provisioning in a cloud computing environment. Accordingly, each of the target hosts 310A-310K (on which the software is being installed) may perform the functionality of the authentication client 110 of FIG. 1 in order to be authenticated by the software provisioning controller 320 (which manages the software provisioning activities in the cloud).

Figure 4:
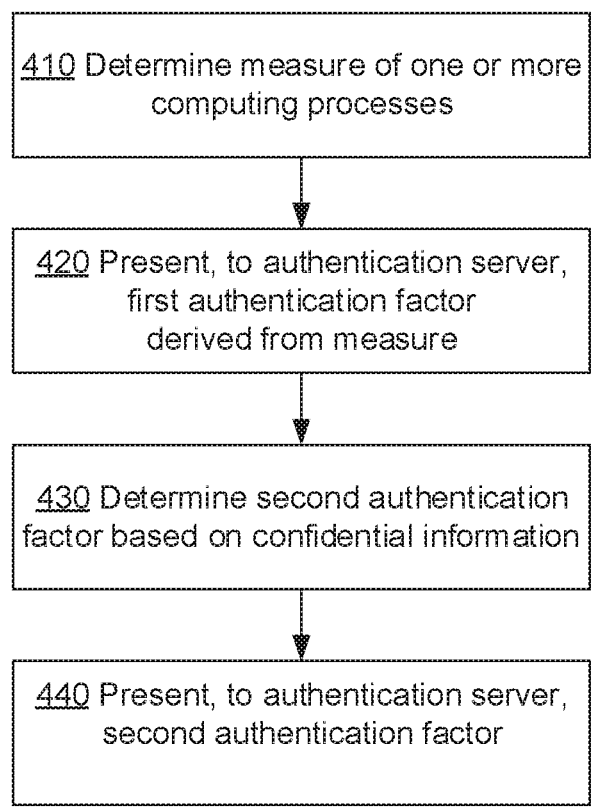
FIG. 4 depicts a flowchart of an example method of multi-factor system-to-system authentication, in accordance with one or more aspects of the present disclosure.

FIG. 4 depicts a flowchart of an example method 400 of multi-factor system-to-system authentication, in accordance with one or more aspects of the present disclosure. The method 400 may be performed by the authentication client 110 of FIG. 1. In some implementations, method 400 may be performed by a single processing thread executed by a processing device. Alternatively, method 400 may be performed by two or more processing threads executed by one or more processing devices, such that each thread would execute one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

At block 410, the computing system implementing the method determines, using a secure execution environment, a measure of one or more computing processes running on the computing system (e.g., within the secure execution environment). In an illustrative example, the secure execution environment may be represented by a TEE implemented by a processor of the computing system implementing the method by a processor of a computing device that is reachable by the computing system over a secure communication channel (e.g., encrypted communication channel). In another illustrative example, the secure execution environment may be represented by an HSM, which may be attached to an internal or external interface of the computing system. In yet another illustrative example, the secure execution environment may be represented by an FPGA attached to an internal or external interface of the computing system, as described in more detail herein above.

The measure computed by the secure execution environment may reflect a pre-execution measurement of one or more computing processes residing in the secure execution environment and/or a measurement of one or more data items to be utilized by those computing processes. The measurement may be performed by computing a cryptographic hash of the executable images of the computing processes and the data items and/or by cryptographically signing the executable images and data items.

At block 420, the computing system presents, to an authentication server, the first authentication factor (e.g., the inherence factor) derived from the measure. The first authentication factor may be the measure itself, or a result of applying a known mathematical transformation to the measure.

At block 430, the computing system determines, using the secure execution environment, the second authentication factor (e.g., the knowledge factor, the possession factor, or a combination thereof). The second authentication factor may be derived from one or more first data items received from the second computing system, one or more confidential second data items received from one or more third computing systems, and/or one or more public data items received from one or more fourth computing systems. In some implementations, computing the second authentication factor may involve receiving authentication challenge data from the authentication server and computing, by one or more computing processes running within the secure execution environment, an authentication response to the authentication challenge. The second authentication factor may then be derived from the authentication response, as described in more detail herein above.

At block 440, the computing system presents the second authentication factor to the authentication server.

Upon receiving an authentication response from the authentication server, the computing system may transmit, to the authentication server or to another computing system in communication with the communication server, a request to perform certain functions (e.g., a digital content request or a software provisioning request), as described in more detail herein above.

Figure 5:
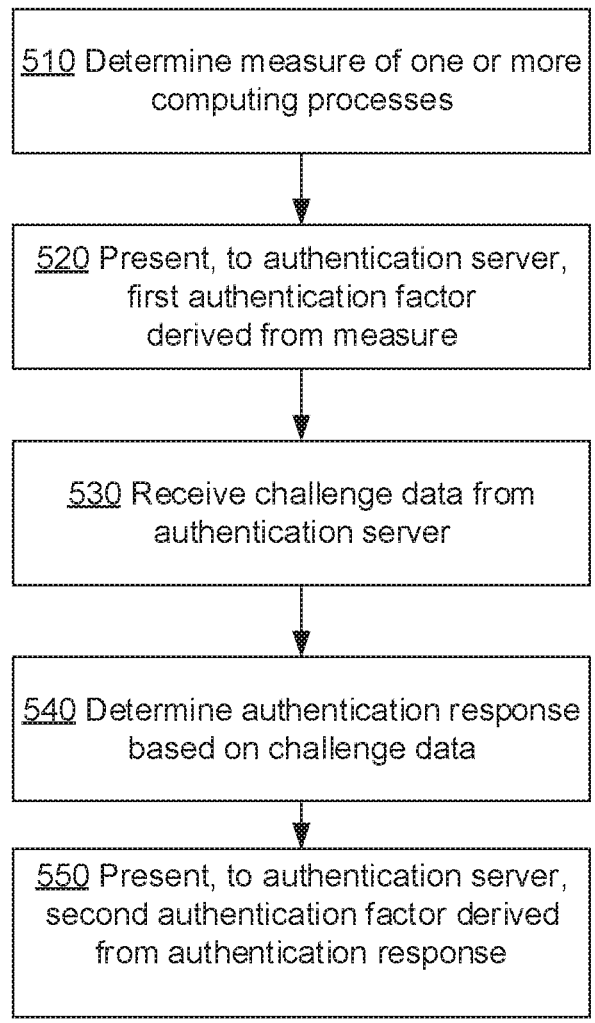
FIG. 5 depicts a flowchart of another example method of multi-factor system-to-system authentication, in accordance with one or more aspects of the present disclosure.

FIG. 5 depicts a flowchart of an example method 500 of multi-factor system-to-system authentication, in accordance with one or more aspects of the present disclosure. The method 500 may be performed by the authentication client 110 of FIG. 1. In some implementations, method 500 may be performed by a single processing thread executed by a processing device. Alternatively, method 500 may be performed by two or more processing threads executed by one or more processing devices, such that each thread would execute one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel and/or in arbitrary selected orders.

At block 510, the computing system implementing the method determines, using a secure execution environment, a measure of a computing processes running on the first computing system (e.g., within the secure execution environment). In an illustrative example, the secure execution environment may be represented by a TEE implemented by a processor of the computing system implementing the method by a processor of a computing device that is reachable by the computing system over a secure communication channel (e.g., encrypted communication channel). In another illustrative example, the secure execution environment may be represented by an HSM, which may be attached to an internal or external interface of the computing system. In yet another illustrative example, the secure execution environment may be represented by an FPGA attached to an internal or external interface of the computing system, as described in more detail herein above.

The measure computed by the secure execution environment may reflect a pre-execution measurement of one or more computing processes residing in the secure execution environment and/or a measurement of one or more data items to be utilized by those computing processes. The measurement may be performed by computing a cryptographic hash of the executable images of the computing processes and the data items and/or by cryptographically signing the executable images and data items.

At block 520, the computing system presents, to an authentication server, the first authentication factor (e.g., the inherence factor) derived from the measure. The first authentication factor may be the measure itself, or a result of applying a known mathematical transformation to the measure.

At block 530, the computing system receives authentication challenge data from the authentication server.

At block 540, the computing system determines, by a computing process running within the secure execution environment, an authentication response to the authentication challenge. The response may be represented by an outcome of executing a secure execution environment-resident process based on confidential data that has been supplied to the authentication client by the authentication server and/or third parties over a period of time before presenting the challenge or based on a combination of confidential and public data, as described in more detail herein above.

At block 550, the computing system presents, to the authentication server, the second authentication factor (e.g., the knowledge factor, the possession factor, or a combination thereof) derived from the authentication response.

Upon receiving an authentication response from the authentication server, the computing system may transmit, to the authentication server or to another computing system in communication with the communication server, a request to perform certain functions (e.g., a digital content request or a software provisioning request), as described in more detail herein above.

Figure 6:
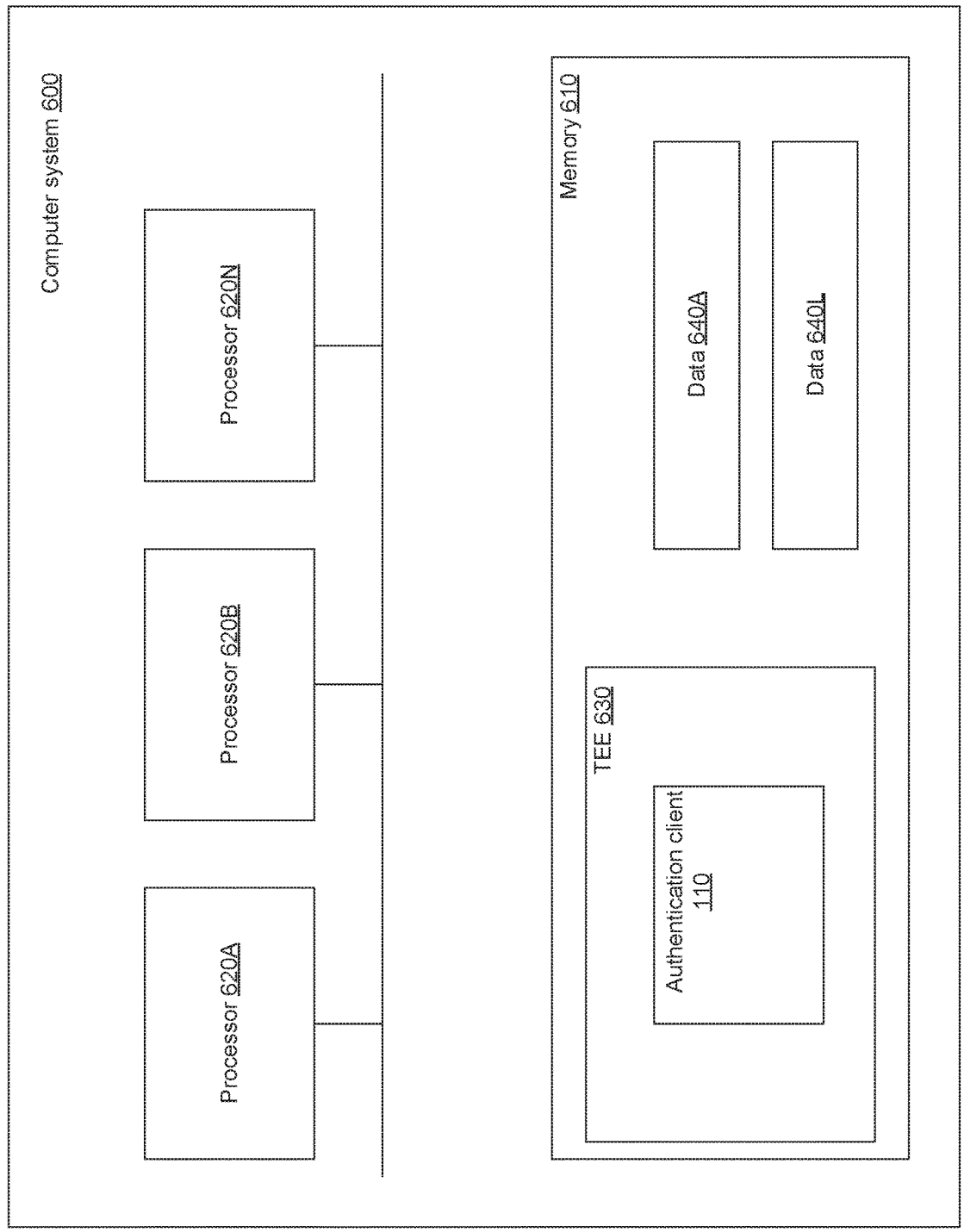
FIG. 6 depicts a block diagram of an example computer system operating in accordance with one or more aspects of the disclosure.

FIG. 6 depicts a block diagram of an example computer system 600 operating in accordance with one or more aspects of the disclosure. In various implementations, computer system 600 may perform the functions of the authentication client 110 of FIG. 1. Computer system 600 comprises a memory 610 and one or more physical processors 620A-620N that are operatively coupled to the memory 610 and execute, within the TEE 630, the code implementing the multi-factor authentication methods 400 and/or 500 performing the functionality of the authentication client 110 of FIG. 1. In an illustrative example, the TEE may be implemented by Intel® SGX secure enclave, which is a private region of encrypted memory, the contents of which would only be decrypted for access by the process running within the enclave. In another illustrative example, the TEE may be implemented by a virtual machine running in the Intel® TDX environment. In another illustrative example, the TEE may be implemented by the AMD® SEV, which encrypts the memory state of each virtual machine using a respective encryption key inaccessible by other virtual machines. The memory 610 may further store one or more data items 640A-640L received from an authentication server and/or from other computer systems, as described in more details herein above.

Figure 7:
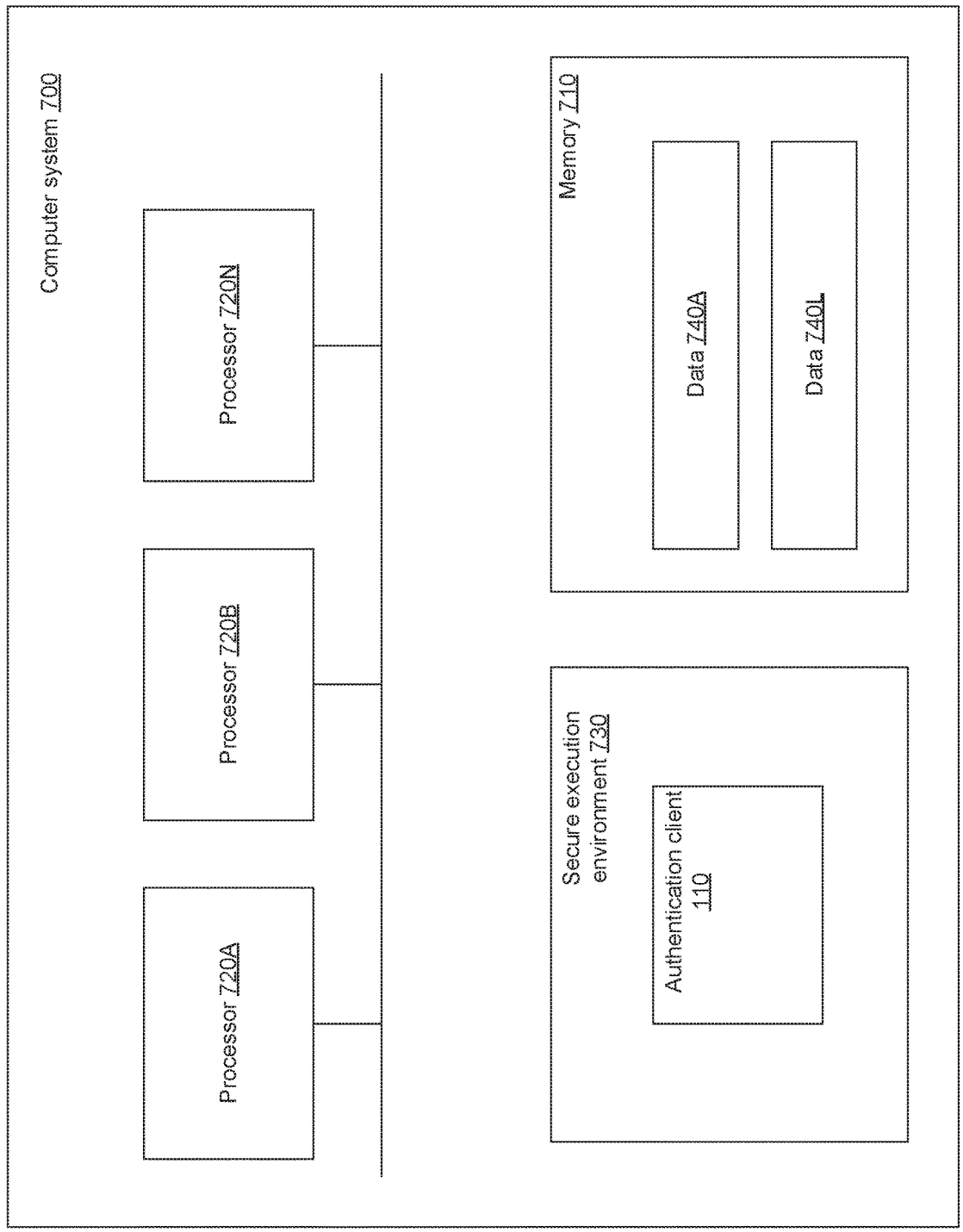
FIG. 7 depicts a block diagram of another example computer system operating in accordance with one or more aspects of the disclosure.

FIG. 7 depicts a block diagram of an example computer system 700 operating in accordance with one or more aspects of the disclosure. In various implementations, computer system 700 may perform the functions of the authentication client 110 of FIG. 1. Computer system 700 comprises a memory 710 and one or more physical processors 720A-720N that are operatively coupled to the memory 710. Computer system 700 further comprises a secure execution environment 730 that is attached to an external or internal interface of the computer system 700. In various illustrative examples, the secure execution environment 730 may be represented by an FPGA, an HSM, or any other suitable device that includes one or more general purpose or specialized microprocessors, which execute at least part of the code implementing the multi-factor authentication methods 400 and/or 500 performing the functionality of the authentication client 110 of FIG. 1. The memory 710 may further store one or more data items 740A-740L received from an authentication server and/or from other computer systems, as described in more details herein above.

Figure 8:
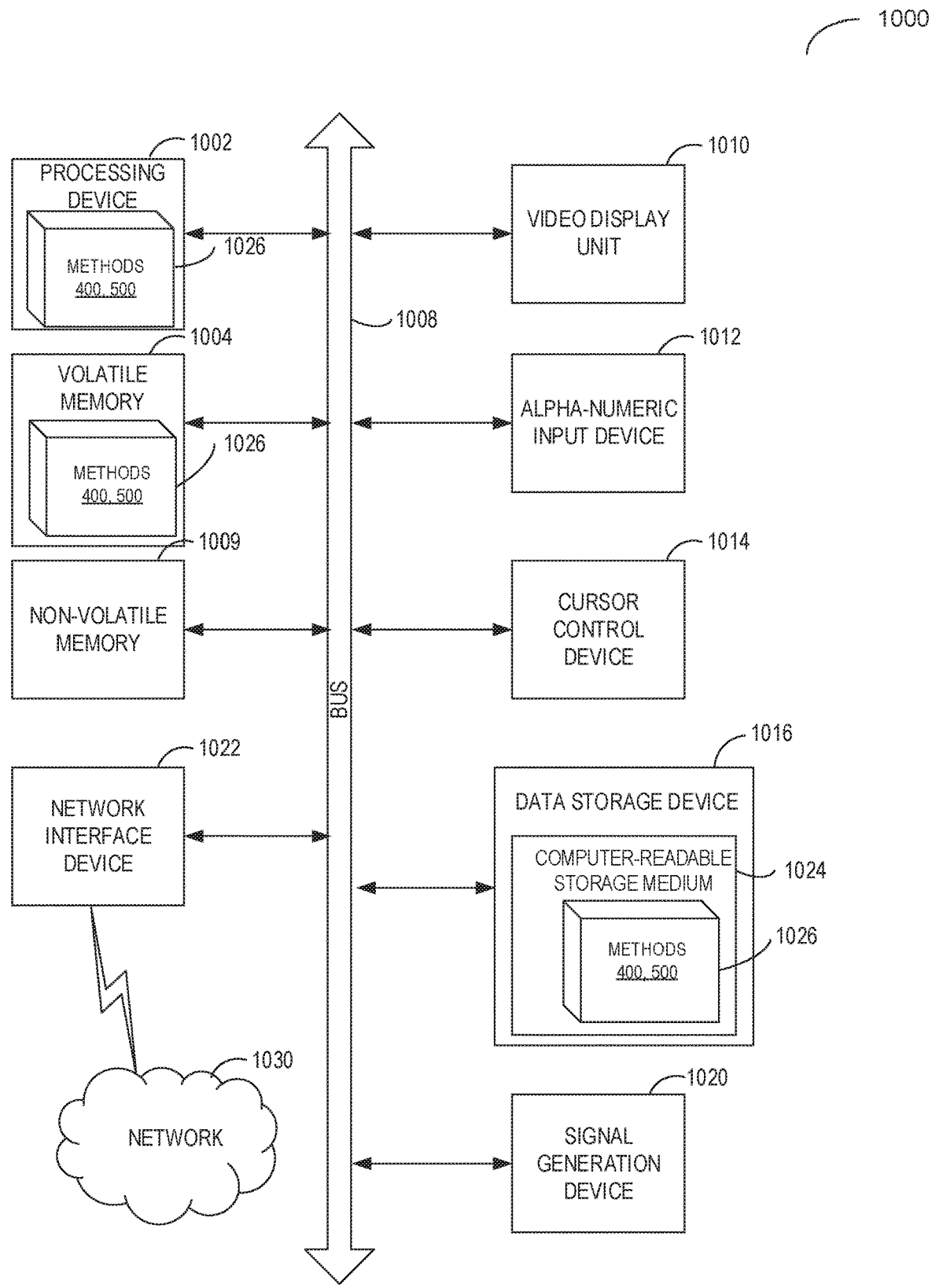
FIG. 8 depicts a high-level component diagram of an example computer system which may be employed to implement the systems and methods described herein.

FIG. 8 depicts a high-level component diagram of an example computer system which may be employed to implement the systems and methods described herein. In various implementations, computer system 1000 may perform the functions of host computer system 120 of FIG. 1. In some implementations, computer system 1000 may be connected (e.g., via a network 1030, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1009 (e.g., read-only memory (ROM) or electrically-erasable programmable ROM (EEPROM)), and a data storage device 1016, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alpha-numeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing methods 400 and/or 500 of multi-factor system-to-system authentication, in accordance with aspects of the present disclosure.

Instructions 1026 may also reside, completely or partially, within volatile memory 1004 and/or within processing device 1002 during execution thereof by computer system 1000, hence, volatile memory 1004 and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: determining, by a first computing system, using a secure execution environment, a measure of one or more computing processes running on the first computing system; presenting, to a second computing system, a first authentication factor derived from the measure; computing, using the secure execution environment, a second authentication factor derived from at least one of: one or more first data items received from the second computing system, one or more confidential second data items received from one or more third computing systems, or one or more public data items received from one or more fourth computing systems; and presenting the second authentication factor to the second computing system.

Example 2 is the method of Example 1, wherein the first computing system performs authentication client functionality, and wherein the second computing system performs authentication server functionality.

Example 3 is the method of Example 1, wherein computing the second authentication factor further comprises: receiving, from the second computing system, an authentication challenge data; determining, using the secure execution environment, an authentication response to the authentication challenge data; and deriving the second authentication factor from the authentication response.

Example 4 is the method of Example 1, wherein the secure execution environment is provided by at least one of: a trusted execution environment (TEE) implemented by a general purpose processor, a hardware security module (HSM) or a field-programmable gate array (FPGA).

Example 5 is the method of Example 1, wherein the one or more computing processes run in the secure execution environment.

Example 6 is the method of Example 1, wherein the measure of the one or more computing processes comprises at least one of: a first value of a first hash function of a memory-resident executable code implementing the one or more computing processes or a second value of a second hash function of a memory-resident data set associated with the one or more computing processes.

Example 7 is the method of Example 1, wherein the first authentication factor represents an inherence factor.

Example 8 is the method of Example 1, wherein the second authentication factor represents at least one of: a knowledge factor or a possession factor.

Example 9 is the method of Example 1, further comprising: responsive to receiving an authentication response from the second computing system, transmitting to the second computing system at least one of: a digital content request or a software provisioning request.

Example 10 is a method, comprising: determining, by an authentication client, e a measure of a first computing processes running in a trusted execution environment (TEE); presenting, to an authentication server, a first authentication factor derived from the measure; receiving from the authentication server, an authentication challenge data item; determining, by a second computing process running in the TEE, an authentication response to the authentication challenge data; and presenting, to the authentication server, a second authentication factor derived from the authentication response.

Example 11 is the method of Example 10, wherein the measure of the first computing process comprises at least one of: a first value of a first hash function of a memory-resident executable code implementing the first computing process or a second value of a second hash function of a memory-resident data set associated with the first computing process.

Example 12 is the method of Example 10, wherein the first authentication factor represents an inherence factor.

Example 13 is the method of Example 10, wherein the second authentication factor represents at least one of: a knowledge factor or a possession factor.

Example 14 is the method of Example 10, further comprising: responsive to receiving an authentication response from the authentication server, transmitting to the authentication server at least one of: a digital content request or a software provisioning request.

Example 15 is a system, comprising: a memory; and a processing device, coupled to the memory, to implement an authentication client residing in a trusted execution environment (TEE), wherein the authentication client is to: determine a measure of a first computing processes running in the TEE; present, to an authentication server, a first authentication factor derived from the measure; receive from the authentication server, an authentication challenge data item; determine, by a second computing process running in the TEE, an authentication response to the authentication challenge data; and present, to the authentication server, a second authentication factor derived from the authentication response.

Example 16 is the system of example 15, wherein the measure of the first computing process comprises at least one of: a first value of a first hash function of a memory-resident executable code implementing the first computing process or a second value of a second hash function of a memory-resident data set associated with the first computing process.

Example 17 is the system of example 15, wherein the first authentication factor represents an inherence factor.

Example 18 is the system of example 15, wherein the second authentication factor represents at least one of: a knowledge factor or a possession factor.

Example 19 is the system of example 15, wherein the processing device is further to: responsive to receiving an authentication response from the authentication server, transmitting to the authentication server at least one of: a digital content request or a software provisioning request.

Example 20 is a computing system, comprising: a means for determining, using a secure execution environment, a measure of one or more computing processes running on the first computing system; a means for presenting, to an authentication server, a first authentication factor derived from the measure; a means for computing, using the secure execution environment, a second authentication factor derived from at least one of: one or more first data items received from the authentication server, one or more confidential second data items received from one or more third computing systems, or one or more public data items received from one or more fourth computing systems; and a means for presenting the second authentication factor to the authentication server.

Example 21 is the computing system of Example 20, wherein computing the second authentication factor further comprises: receiving, from the authentication server, an authentication challenge data; determining, using the secure execution environment, an authentication response to the authentication challenge data; and deriving the second authentication factor from the authentication response.

Example 22 is the computing system of Example 20, wherein the secure execution environment is provided by at least one of: a trusted execution environment (TEE) implemented by a general purpose processor, a hardware security module (HSM) or a field-programmable gate array (FPGA).

Example 23 is the computing system of Example 20, wherein the one or more computing processes run in the secure execution environment.

Example 24 is the computing system of Example 20, wherein the measure of the one or more computing processes comprises at least one of: a first value of a first hash function of a memory-resident executable code implementing the one or more computing processes or a second value of a second hash function of a memory-resident data set associated with the one or more computing processes.

Example 25 is the computing system of Example 20, wherein the first authentication factor represents an inherence factor.

Example 26 is the computing system of Example 20, wherein the second authentication factor represents at least one of: a knowledge factor or a possession factor.

Example 27 is the computing system of Example 20, further comprising: a means for, responsive to receiving an authentication response from the authentication server, transmitting to the authentication server at least one of: a digital content request or a software provisioning request.

Example 28 is a non-transitory computer-readable storage medium comprising executable instructions that, when executed by a computing system, cause the computing system to: determine, using a secure execution environment, a measure of one or more computing processes running on the first computing system; present, to an authentication server, a first authentication factor derived from the measure; compute, using the secure execution environment, a second authentication factor derived from at least one of: one or more first data items received from the authentication server, one or more confidential second data items received from one or more third computing systems, or one or more public data items received from one or more fourth computing systems; and present the second authentication factor to the authentication server.

Example 29 is the non-transitory computer-readable storage medium of Example 28, wherein computing the second authentication factor further comprises: receiving, from the authentication server, an authentication challenge data; determining, using the secure execution environment, an authentication response to the authentication challenge data; and deriving the second authentication factor from the authentication response.

Example 30 is the non-transitory computer-readable storage medium of Example 28, wherein the secure execution environment is provided by at least one of: a trusted execution environment (TEE) implemented by a general purpose processor, a hardware security module (HSM) or a field-programmable gate array (FPGA).

Example 31 is the non-transitory computer-readable storage medium of Example 28, wherein the measure of the one or more computing processes comprises at least one of: a first value of a first hash function of a memory-resident executable code implementing the one or more computing processes or a second value of a second hash function of a memory-resident data set associated with the one or more computing processes.

Example 32 is the non-transitory computer-readable storage medium of Example 28, further comprising executable instructions that, when executed by the computing system, cause the computing system to: responsive to receiving an authentication response from the authentication server, transmit a digital content request.

Example 33 is the non-transitory computer-readable storage medium of Example 28, further comprising executable instructions that, when executed by the computing system, cause the computing system to: responsive to receiving an authentication response from the authentication server, transmit a software provisioning request.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   determining, by a first computing system, using a secure execution environment, a measure of one or more computing processes running on the first computing system;
   presenting, to a second computing system, a first authentication factor derived from the measure;

computing, using the secure execution environment, a second authentication factor derived from at least one of: one or more first data items received from the second computing system, one or more confidential second data items received from one or more third computing systems, or one or more public data items received from one or more fourth computing systems; and presenting the second authentication factor to the second computing system.

2. The method of claim 1, wherein the first computing system performs authentication client functionality, and wherein the second computing system performs authentication server functionality.

3. The method of claim 1, wherein computing the second authentication factor further comprises:
receiving, from the second computing system, an authentication challenge data;
determining, using the secure execution environment, an authentication response to the authentication challenge data; and
deriving the second authentication factor from the authentication response.

4. The method of claim 1, wherein the secure execution environment is provided by at least one of: a trusted execution environment (TEE) implemented by a general purpose processor, a hardware security module (HSM) or a field-programmable gate array (FPGA).

5. The method of claim 1, wherein the one or more computing processes run in the secure execution environment.

6. The method of claim 1, wherein the measure of the one or more computing processes comprises at least one of: a first value of a first hash function of a memory-resident executable code implementing the one or more computing processes or a second value of a second hash function of a memory-resident data set associated with the one or more computing processes.

7. The method of claim 1, wherein the first authentication factor represents an inherence factor.

8. The method of claim 1, wherein the second authentication factor represents at least one of: a knowledge factor or a possession factor.

9. The method of claim 1, further comprising:
responsive to receiving an authentication response from the second computing system, transmitting to the second computing system at least one of: a digital content request or a software provisioning request.

10. A system, comprising:
a memory; and
a processing device, coupled to the memory, the processing device to:
determine, using a secure execution environment, a measure of one or more computing processes running in the system;
present, to a second system, a first authentication factor derived from the measure;
compute, using the secure execution environment, a second authentication factor derived from at least one of: one or more first data items received from the second system, one or more confidential second data items received from one or more third systems, or one or more public data items received from one or more fourth systems; and
present, to the second system, the second authentication factor.

11. The system of claim 10, wherein the measure of the one or more computing processes comprises at least one of: a first value of a first hash function of a memory-resident executable code implementing the one or more computing processes or a second value of a second hash function of a memory-resident data set associated with the one or more computing processes.

12. The system of claim 10, wherein the first authentication factor represents an inherence factor.

13. The system of claim 10, wherein the second authentication factor represents at least one of: a knowledge factor or a possession factor.

14. The system of claim 10, wherein the processing device is further to:
responsive to receiving an authentication response from the second system, transmitting to the second system at least one of: a digital content request or a software provisioning request.

15. A non-transitory computer-readable storage medium comprising executable instructions that, when executed by a computing system, cause the computing system to:
determine, using a secure execution environment, a measure of one or more computing processes running on the computing system;
present, to an authentication server, a first authentication factor derived from the measure;
compute, using the secure execution environment, a second authentication factor derived from at least one of: one or more first data items received from the authentication server, one or more confidential second data items received from one or more third computing systems, or one or more public data items received from one or more fourth computing systems; and
present the second authentication factor to the authentication server.

16. The non-transitory computer-readable storage medium of claim 15, wherein computing the second authentication factor further comprises:
receiving, from the authentication server, an authentication challenge data;
determining, using the secure execution environment, an authentication response to the authentication challenge data; and
deriving the second authentication factor from the authentication response.

17. The non-transitory computer-readable storage medium of claim 15, wherein the secure execution environment is provided by at least one of: a trusted execution environment (TEE) implemented by a general purpose processor, a hardware security module (HSM) or a field-programmable gate array (FPGA).

18. The non-transitory computer-readable storage medium of claim 15, wherein the measure of the one or more computing processes comprises at least one of: a first value of a first hash function of a memory-resident executable code implementing the one or more computing processes or a second value of a second hash function of a memory-resident data set associated with the one or more computing processes.

19. The non-transitory computer-readable storage medium of claim 15, further comprising executable instructions that, when executed by the computing system, cause the computing system to:
responsive to receiving an authentication response from the authentication server, transmit a digital content request.

20. The non-transitory computer-readable storage medium of claim 15, further comprising executable instructions that, when executed by the computing system, cause the computing system to:
   responsive to receiving an authentication response from the authentication server, transmit a software provisioning request.

\* \* \* \* \*